US011573837B2

(12) United States Patent
Wang et al.

(10) Patent No.: US 11,573,837 B2
(45) Date of Patent: Feb. 7, 2023

(54) SERVICE RETENTION IN A COMPUTING ENVIRONMENT

(71) Applicant: INTERNATIONAL BUSINESS MACHINES CORPORATION, Armonk, NY (US)

(72) Inventors: Meng Wang, Beijing (CN); Peng Hui Jiang, Beijing (CN); Li Jia Meng, Shanghai (CN); Shao Mei Ji, Beijing (CN); Yuan Yuan Jia, Beijing (CN); Li Wei Wang, Beijing (CN); Ge Song, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 297 days.

(21) Appl. No.: 16/939,128

(22) Filed: Jul. 27, 2020

(65) Prior Publication Data

US 2022/0027205 A1     Jan. 27, 2022

(51) Int. Cl.
| | | |
|---|---|---|
| *G06F 9/455* | (2018.01) | |
| *G06F 9/46* | (2006.01) | |
| *G06F 9/50* | (2006.01) | |

(52) U.S. Cl.
CPC ........ *G06F 9/5072* (2013.01); *G06F 9/45558* (2013.01); *G06F 9/5011* (2013.01); *G06F 2009/45562* (2013.01); *G06F 2009/45575* (2013.01); *G06F 2009/45595* (2013.01)

(58) Field of Classification Search
CPC .. G06F 9/5072; G06F 9/45558; G06F 9/5011; G06F 2009/45562; G06F 2009/45575; G06F 2009/45595

USPC ......................................................... 718/104
See application file for complete search history.

(56) References Cited

U.S. PATENT DOCUMENTS

| | | | |
|---|---|---|---|
| 7,627,726 B2 | 12/2009 | Chandrasekaran | |
| 7,720,935 B2 | 5/2010 | Anantha | |
| 8,059,675 B1* | 11/2011 | Cook | H04L 41/0896 370/464 |
| 8,307,362 B1* | 11/2012 | Gong | G06F 9/5077 718/1 |
| 8,849,955 B2 | 9/2014 | Prahlad | |
| 9,038,068 B2 | 5/2015 | Engle | |
| 9,246,986 B1* | 1/2016 | Ward, Jr. | H04M 15/80 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Bradley A Teets
(74) *Attorney, Agent, or Firm* — L. Jeffrey Kelly

(57) ABSTRACT

Embodiments of the present disclosure relate to a method, system and computer program product for service retention in a computing environment. According to the method, a deprovision request for deprovisioning a target service instance provisioned in a computing environment is received. In response to the deprovision request, a retention policy associated with the target service instance is determined. The retention policy indicates an action to be applied on the target service instance. The action causes a resource usage level of the target service instance to reduce. Based on the retention policy, the target service instance is modified to obtain a retention service instance provisioned in the computing environment for use in restoration of the target service instance.

20 Claims, 8 Drawing Sheets

(56) References Cited

U.S. PATENT DOCUMENTS

| | | | |
|---|---|---|---|
| 9,529,613 B2 | 12/2016 | Muller | |
| 10,171,371 B2 | 1/2019 | Anwar | |
| 10,656,863 B1* | 5/2020 | Vines | G06F 3/0611 |
| 11,231,955 B1* | 1/2022 | Shahane | G06F 9/5022 |
| 2002/0065907 A1* | 5/2002 | Cloonan | H04L 41/5006 |
| | | | 709/228 |
| 2015/0236976 A1 | 8/2015 | Tseitlin | |
| 2016/0048408 A1 | 2/2016 | Madhu | |
| 2016/0188377 A1* | 6/2016 | Thimmappa | H04L 61/5007 |
| | | | 718/104 |
| 2017/0063714 A1* | 3/2017 | Xiang | H04L 41/40 |
| 2019/0347009 A1 | 11/2019 | Andken | |

* cited by examiner

SERVICE RETENTION IN A COMPUTING ENVIRONMENT

BACKGROUND

The present disclosure generally relates to computer techniques and more particularly, to a method, system, and computer program product for service retention in a computing environment.

Cloud computing, which involves the delivery of hosted services in a computing environment, is one of the fastest growing technology in computer technologies. For example, cloud computing allows a consumer to obtain processing resources, such as networks, network bandwidth, servers, processing, memory, storage, applications, and virtual machines, as services provisioned when needed. A service provisioned in the computing environment is referred to as a service instance.

The consumer can provision new service instances or deprovision existing service instances. At certain times, the consumer may want to regain the deprovisioned service instance due to various reasons such as an accidental deletion. It is desired to restore the deprovisioned service instance for the consumer without data loss within a certain period of time.

SUMMARY

According to an embodiment of the present disclosure, there is provided a computer-implemented method. According to the method, a deprovision request for deprovisioning a target service instance provisioned in a computing environment is received. In response to the deprovision request, a retention policy associated with the target service instance is determined. The retention policy indicates an action to be applied on the target service instance. The action causes a resource usage level of the target service instance to reduce. Based on the retention policy, the target service instance is modified to obtain a retention service instance provisioned in the computing environment for use in restoration of the target service instance.

According to a further embodiment of the present disclosure, there is provided a system. The system includes a processing unit; and a memory coupled to the processing unit and storing instructions thereon. The instructions, when executed by the processing unit, perform acts of any one of the above methods according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform any one of the above methods according to the embodiment of the present disclosure.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
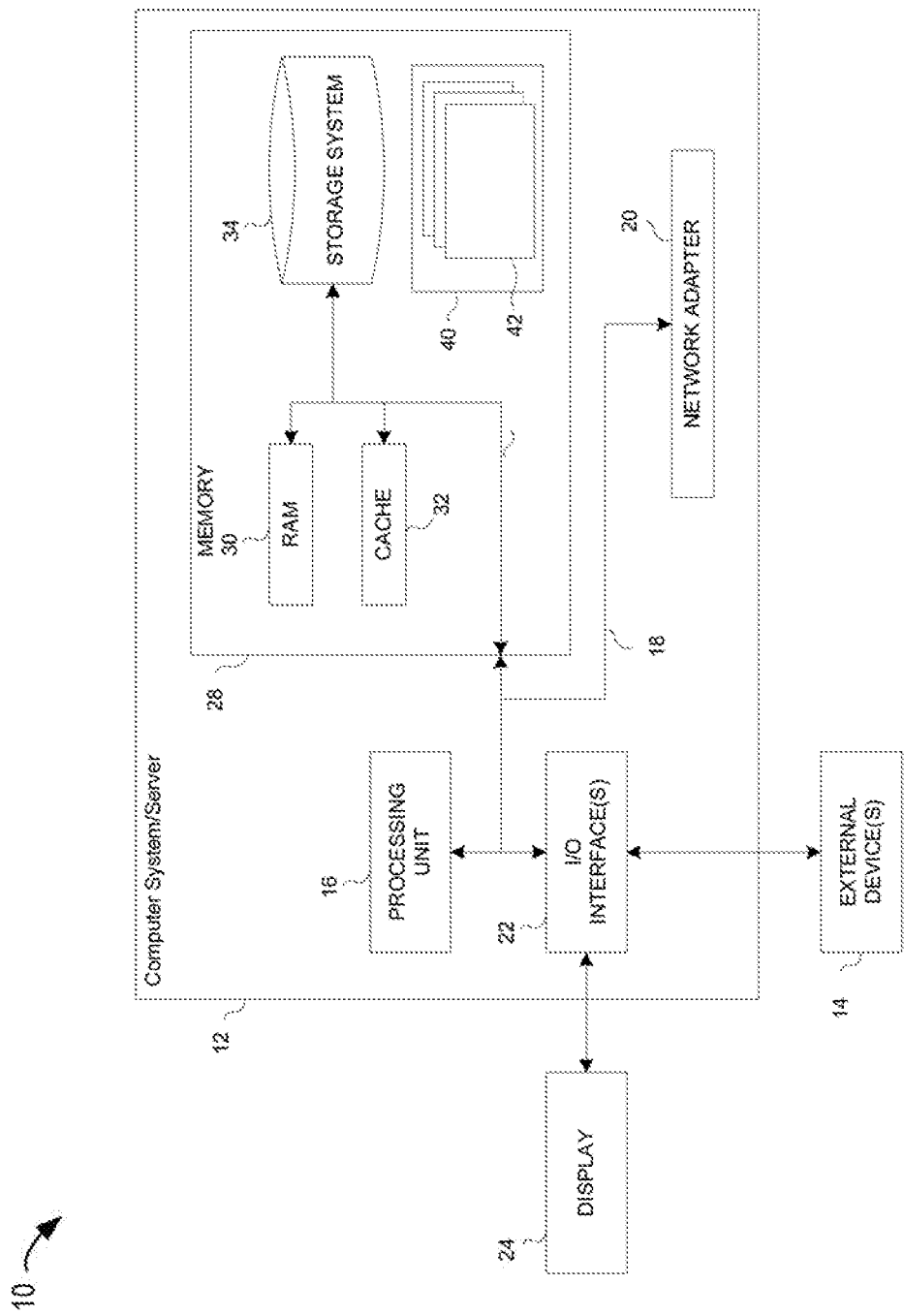
FIG. 1 depicts a cloud computing node in accordance with an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
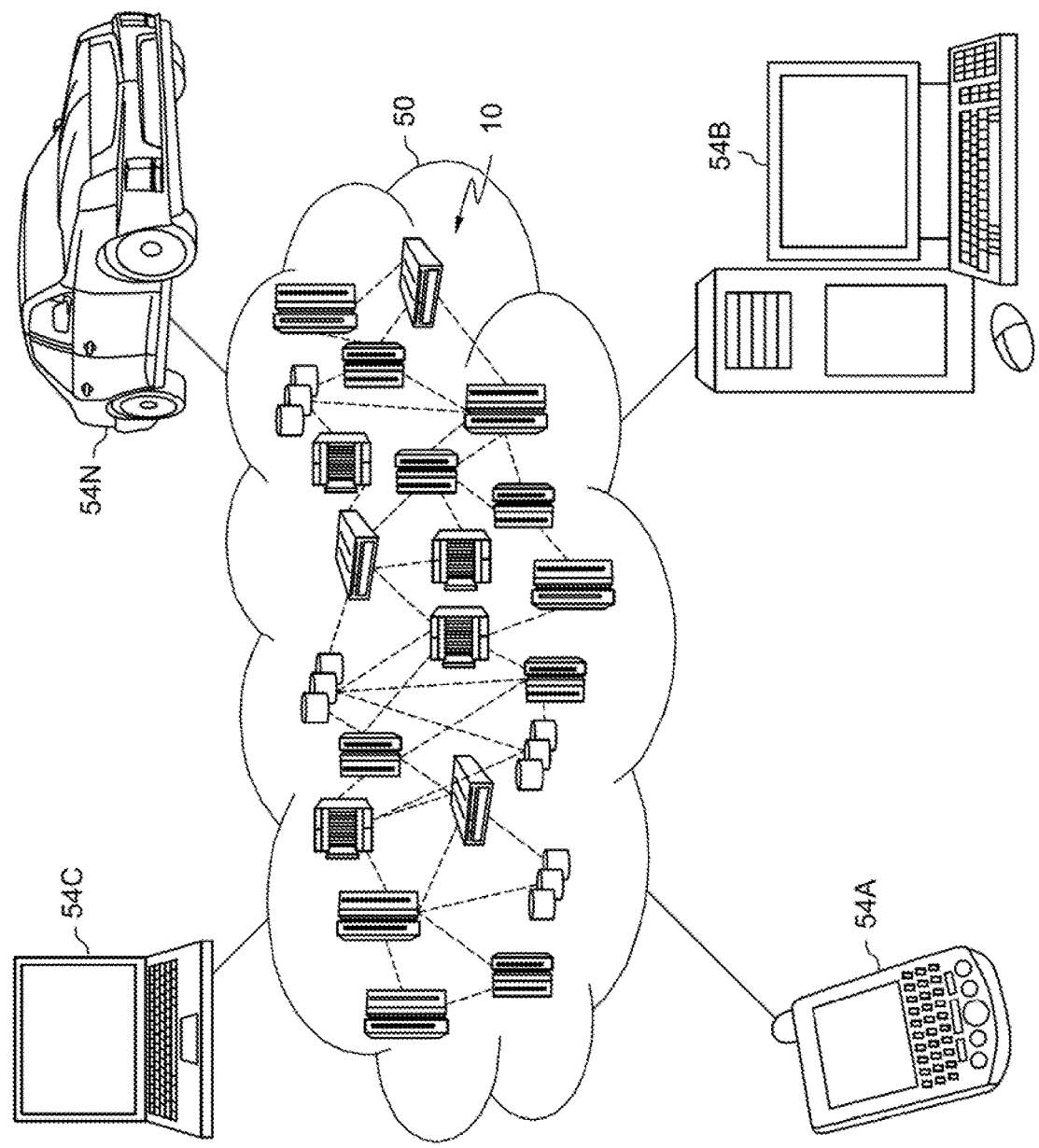
FIG. 2 depicts a cloud computing environment in accordance with an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
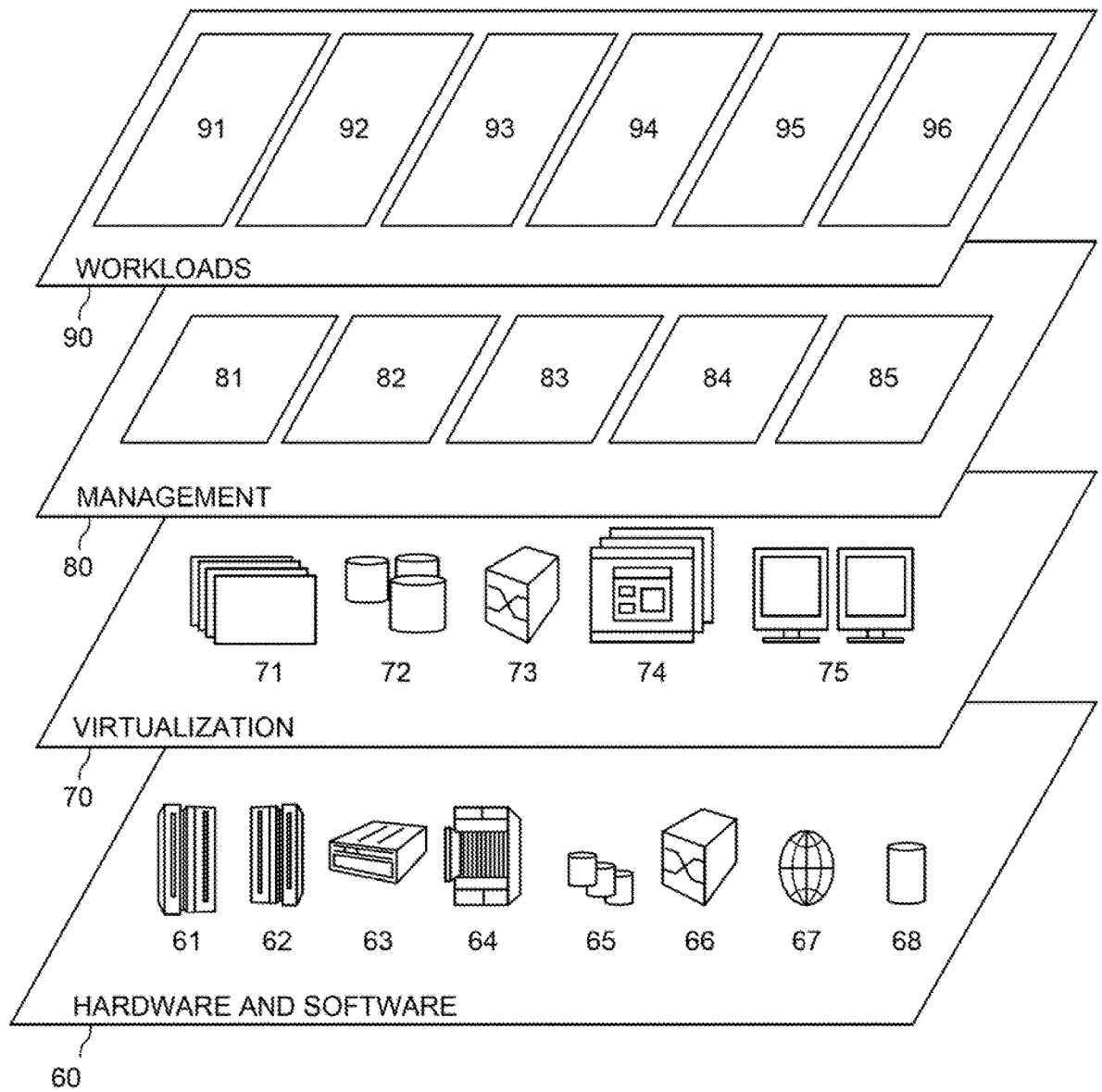
FIG. 3 depicts abstraction model layers in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service retention 96. The functionalities of service retention 96 will be described in the following embodiment of the present disclosure.

As mentioned above, it is desired to restore a service instance deprovisioned by a consumer without data loss within a certain period of time. Conventionally, to allow a service instance to be restored, resources in the computing environment occupied by the service instance need to be retained as they are when the service instance is deprovisioned. In other words, the service instance being deprovisioned means that the service instance is deprovisioned from the perspective of the consumer while the resources related to the service instance are not released and cannot be reused for other purposes from the perspective of a service provider of the computing environment. As such, if the consumer requests to restore the service instance within a predetermined retention period, the same service instance can be restored for the consumer quickly. On the other hand, if the consumer does not restore the service instance, once the retention period is expired, the resources can be reclaimed by the computing environment.

However, as the resources are not reclaimed by the computing environment during the retention period, the cost corresponding to the actual amount of resources occupied by the service instance has to be covered by the service provider. The cost is related to the amount of the physical resources occupied by the service provider in the computing environment. As more service instances provisioned in or deprovisioned from the computing environment, the higher cost and lower resource utilization for service providers will become a major concern in the service provisioning process.

According to example embodiments of the present disclosure, there is proposed a solution for service retention in a cost-efficient manner while preserving the opportunity to restore deprovisioned service instances. In this solution, if a target service instance provisioned in a computing environment is requested to be deprovisioned, a retention policy is determined for the target service instance. The retention policy indicates an action to be applied on the target service instance, which can cause a resource utilization of the target service instance to reduce. Accordingly, the target service instance is modified based on the retention policy to obtain a further service instance (referred to as a "retention service instance"). The retention service instance is provisioned in the computing environment with a reduced resource utilization, to enable possible restoration of the target service instance.

Through the solution, instead of directly retaining the service instance for a retention period after the deprovision request is received, the target service instance is modified according to a retention policy to reduce its resource utilization. The service retention process can effectuate cost savings while preserving the opportunity of quickly restoring the target service instance.

Other advantages of the present disclosure will be described with reference to the example embodiments and the accompanying drawings below.

Figure 4:
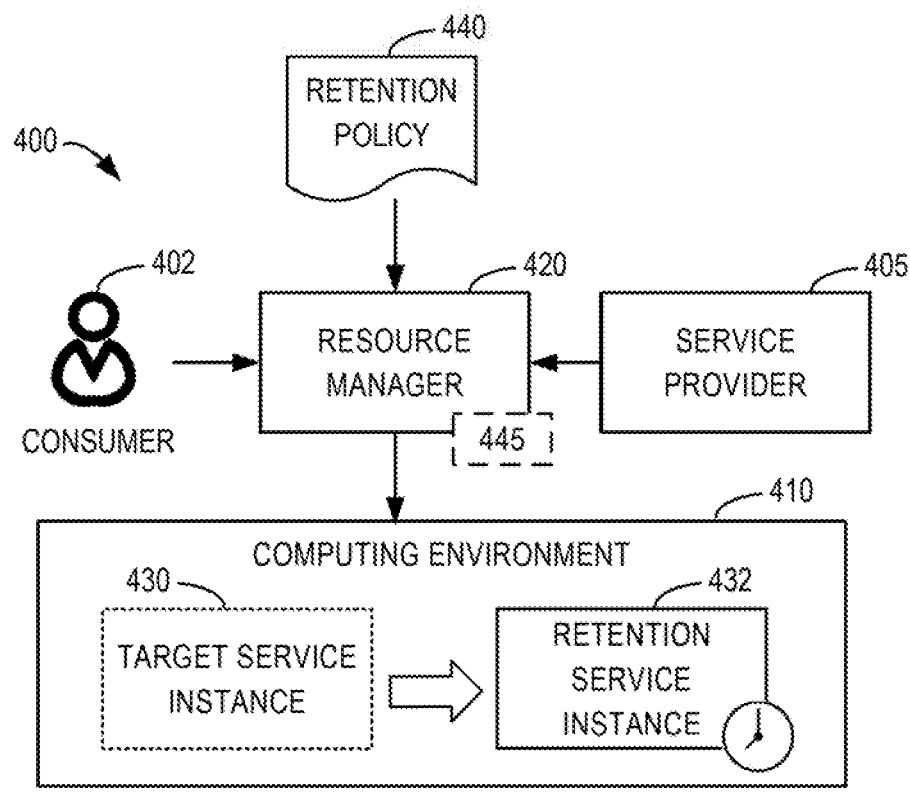
FIG. 4 depicts a block diagram of computing architecture in accordance with an embodiment of the present disclosure.

Reference is now made to FIG. 4, which illustrates a block diagram of computing architecture 400 in accordance with some embodiments of the present disclosure.

As illustrated in FIG. 4, a computing environment 410, in which a consumer 402 can request to provision one or more service instances, is involved. The computing environment 410 may include various infrastructure devices to provide a pool of physical resources for supporting services running thereon. The resources provided in the computing environment 410 may include processing resources, memory, storage, network resources, and/or the like. In some embodiments, the computing environment 410 may be a cloud computing environment, such as a public cloud or a private cloud.

The computing environment 410 may be provided by a service provider 405. The service provider 405 replies on a resource manager 420 to manage the resource provisioning in the computing environment 410. The resource manager 420 may be implemented in software, hardware, firmware, and/or any combination thereof. Although shown as being separated, the resource manager 420 may be implemented in the computing environment 410. In other embodiments, the resource manager 420 may be implemented in other computing environments than the computing environment 410.

During operation, a consumer 402, which may be a business entity, a person, or other entity, requests for provisioning of one or more services in the computing environment 410 via the resource manager 420. A service that is actually provisioned or initiated in the computing environment 410 may be referred to as an instance of the service or a service instance for short. As used herein, a "service" can represent an application, multiple applications, or a subset of a single application. Generally speaking, the terms "service" and "application" can be used interchangeably. Each service may be of a certain service type. In the computing environment 410, one or more service instances of a same service type may be deployed by one or more consumers 402.

The provisioning of a service instance may require an amount of resources of the computing environment 410 to support its operation. Depending on the type of the service and the resource capacity purchased by the consumer 402, different types and amounts of resources may be occupied by the provisioned service instance.

The consumer 402 may want to deprovision an existing service instance due to various reasons. According to embodiments of the present disclosure, it is desired to provide a retention period for the service instance that is to be deprovisioned by the consumer 402. During the retention period, the resource manager 420 allows the consumer 402 to restore the service instance without data loss after the initiation of deprovisioning, instead of redeploying a new same service instance (which may lead to loss of data pertaining to the previous deprovisioned service instance).

For the purpose of illustration, in the example of FIG. 4, a target service instance 430 is illustrated as being provisioned in the computing environment 410 and is to be deprovisioned by the consumer 402. It would be appreciated that although one service instance is illustrated, one or more other service instances of the same or different service types may also be provisioned in the computing environment 410, sharing the pool of resources.

At certain times during operation, the resource manager 420 receives a deprovision request for deprovisioning or cancelling the target service instance 430, for example, initiated by the consumer 402. In some examples, the deprovision request may be initiated on an instance basis where one or more individual service instances are expected to be deprovisioned from the computing environment. In some examples, the deprovision request may be initiated on a service type basis or an account basis, where one or more services of the same service type or services of the same user account are expected to be deprovisioned.

If the resource manager 420 determines that the target service instance 430 is to be deprovisioned, it determines a retention policy associated with the target service instance 430. Of course, if more than one service instance provisioned in the computing environment 410 are determined to be deprovisioned, the resource manager 420 may perform a similar process to handle each of the service instances. In the following, the operations implemented on the target service instance 430 are discussed as an example.

To enable service retention, in embodiments of the present disclosure, a retention policy 440 is enforced on the target service instance 430 to define how the target service instance 430 is retained for restoration. The retention policy 440 associated with the target service instance 430 is defined to indicate an action to be applied on the target service instance 430, and the action may cause a resource usage level of the target service instance 430 to reduce.

Depending on actions to be applied on the target service instance 430, there may be multiple types of retention policies that are selectable. The overall purpose of the actions is to reduce a resource usage during the retention period associated with the target service instance 430. In some embodiments, the retention policy 440 may indicate an action of aggregating the target service instance 430 with one or more further service instances of the same service type into a unified service instance. Such retention policy may be referred to as a service aggregating policy. In some embodiments, the retention policy 440 may indicate an action of scaling down a capacity of the target service instance 430. Such retention policy may be referred to as a capacity scaling policy. In some embodiments, the retention policy 440 may indicate an action of downgrading the target service instance 430, especially downgrading a set of resources using for provisioning the target service instance 430 in the computing environment 410. Such retention policy may be referred to as a service downgrading policy. It would be appreciated that other retention policies may also be defined for retention of service instances, dependent upon whether the resource usage level can be reduced once the indicated actions are applied.

A retention policy may be defined as an object associated with a service instance. In some embodiments, in addition to the action to be applied on the service instance, the retention policy may further indicate a retention period associated with the service instance. An example template for defining a retention policy may be provided in following Table 1.

TABLE 1

Example template for defining a retention policy

| Name | Type | Description |
| --- | --- | --- |
| id | string | An identifier of the retention policy, such as a Universally Unique Identifier (UUID) |
| policy_name | string | A name of the retention policy |
| retention_period | int | The retention period, such as hours, days, weeks, or the like |
| action | string | Actions to be applied, for example, service aggregating, capacity scaling, service downgrading, or the like |

By specifying corresponding identifiers, policy names, retention periods, and actions, different retention policies can be created. It would be appreciated that Table 1 is provided for the purpose of illustration only. A retention policy according to some embodiments of the present disclosure may include less, more, or other information in addition to the action to be applied.

In some embodiments, the retention policy 440 applicable for the target service instance 430 may be specified by either the service provider 405 or the consumer 402. For example, the service provider 405 may specify one or more retention policies selectable for service instances to be provisioned in the computing environment 410. The consumer 402, when deploying one or more service instance, may be notified of the one or more retention policies and sometimes may be allowed to select the retention policy 440 for the target service instance 430. In some embodiments, the retention policy 440 may be specified on an instance basis, specifically for the target service instance. In some embodiments, the retention policy 440 may be specified on a service basis or an account basis, where one or more services of the same service type or services of the same user account may be associated with a same retention policy.

An example template for specifying a service type with an associated retention policy may be provided in following Table 2.

TABLE 2

Example template for specifying a service type

| Name | Type | Description |
| --- | --- | --- |
| id | string | An identifier of the service type, such as an entity UUID |
| service_name | string | A name of the serviced type |
| polices | array | A list of retention policies that could be adopted by this service type |
| default_policy | string | A default retention policy if not specified |
| policy_property | object | One or more policy properties to be configured for this service type |

According to the template for a certain service type, the selectable retention policies and the default retention policy may be determined. The policy properties, as indicated in Table 2, may include those that needed to be specifically configured for the service type in order to facilitate the implementation of the retention policies. The policy properties may not be always required in some cases. Some examples of such policy properties will be discussed in the following.

The consumer 402, when deploying the target service instance 430 into the computing environment 410, may be aware of the possible retention policies. The resource manager 420, upon reception of the deprovision request for deprovisioning the target service instance 430, may also determine which retention policy is enforced on the target service instance 430. It would be appreciated that the retention policy associated with the target service instance 430 may be maintained as metadata of the target service instance 430 in other manners.

In embodiments of the present disclosure, upon determination of the retention policy 440, the resource manager 420 modifies the target service instance 430 based on the retention policy 440, for example, by applying the indicated action on the target service instance 430. As a result, a further service instance, i.e., a retention service instance 432 is obtained and provisioned in the computing environment 410 after the modification of the target service instance 430. As the action indicated by the retention policy 440 is to reduce a resource usage level of the target service instance 430, the resulting retention service instance 432 may not be exactly the same as the target service instance 430 but can still be used to recover the target service instance 430 if required. The retention service instance 432 is maintained in the computing environment 410 for the retention period, with a reduced resource usage level for provisioning. Since the resource usage level is reduced, as compared with directly maintaining the target service instance 430 as it is without performing any modification, the resource cost can be reduced during the retention period.

Depending on the specific type of the retention policy 440, the target service instance 430 may be modified in different manners and the resulting retention service instance 432, some embodiments of which will be discussed in detail below.

In some embodiments, in addition to the retention service instance 432, the resource manager 420 may further generate restoration information 445 associated with the target service instance 430 which is used to enable the restoration of the target service instance 430. The restoration information 445 may sometimes be referred to as a reclamation record. The restoration information 445 may be maintained by the resource manager 420 for the target service instance 430 for the retention period. After the retention period is expired, the restoration information 445 may be discarded for saving the storage space.

In some embodiments, the restoration information 445 may indicate the retention policy 440 associated with the target service instance 430 because different retention policies may require different restoration manners. Depending on the type of the retention policy 440, the restoration information 445 may include information of one or more retention properties which may need to be recorded for restoration of the target service instance 430. For example, the retention properties of the restoration information 445 may indicate identification of a set of resources used in provisioning the target service instance, especially the resources that are to be released in the retention period. As such, the same resources can be provided to deploy the target service instance 430 if the consumer 402 requests to restore this instance. Other retention properties will be described in the following embodiments.

In some embodiments, the restoration information 445 may further include metadata associated with the target service instance, such as an identifier of the service type of the target service instance 430, an identifier of the target service instance 430, an identifier of the user account for the target service instance 430, a region where the target service instance 430 is provisioned, a reclamation state indicating whether resources for provisioning the target service instance 430 may be reclaimed, a target time when the retention period is expired, and/or the like. With the identification of the target service instance 430, the restoration information 445 may be identified and mapped to the target service instance 430. Thus, it is easier to perform future restoration of the target service instance 430 based on the restoration information 445.

An example template for specifying the restoration information 445 with an associated retention policy may be provided in following Table 3.

TABLE 3

Example template for specifying restoration information

| Name | Type | Description |
|---|---|---|
| id | string | An identifier (e.g., UUID) for the record of the restoration information associated with the target service instance |
| service_type_id | string | An identifier of the service type |
| service_instance_id | string | An identifier of the target service instance |
| region | string | A region of the target service instance |
| state | string | A reclamation state |
| account_id | string | An identifier of a user account for the target service instance |
| policy_id | string | The retention policy applied to the target service instance |
| target_time | string | Target time when retention period is expired |
| retention_properties | object | One or more retention properties based on the type of the retention policy, e.g., identification of the resources for provisioning the target service instance |

In some embodiments, to improve the resource utilization in the computing environment 410, a set of resources in the computing environment 410 used in provisioning the target source instance 430 but not used in provisioning the retention service instance 432 may be released. After the retention service instance 432 is obtained and provisioned in the computing environment 410, the resource manager 420 may reclaim a set of resources in the computing environment 410 used in provisioning the target source instance 430 but not used in provisioning the retention service instance 432. The information of the set of resources may be recorded in the restoration information 445. The reclaimed resources may be reused for future provisioning.

Some specific embodiments related to application of the service aggregating policy, the capacity scaling policy, and the service downgrading policy will be respectively discussed in detail below with reference to FIGS. 5-7.

Figure 5:
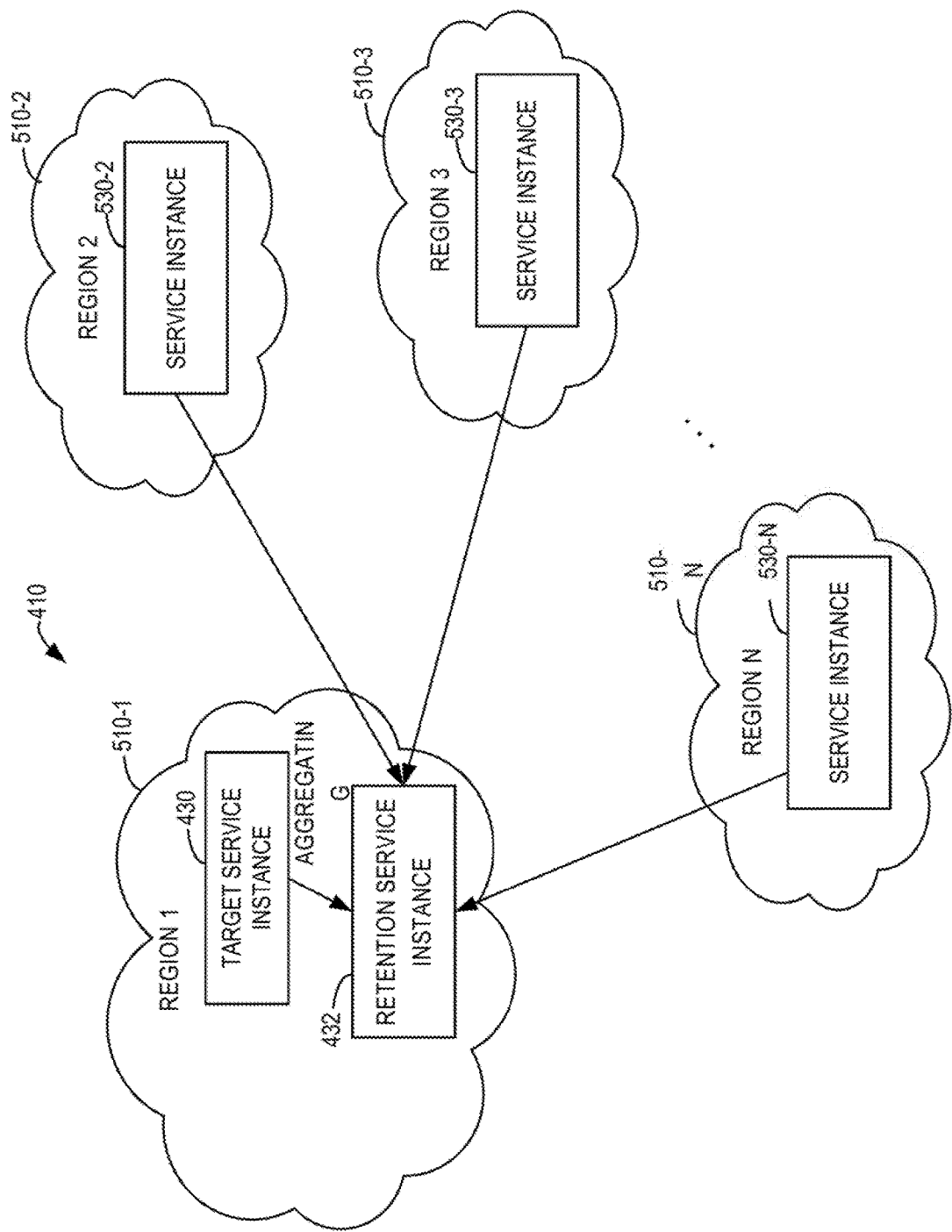
FIG. 5 depicts a block diagram of an example computing environment in which a service aggregating policy is applied in accordance with an embodiment of the present disclosure.

FIG. 5 depicts a block diagram of an example of the computing environment 410 in which a service aggregating policy is applied in accordance with some embodiments of the present disclosure.

In the illustrated example, the target service instance 430 and one or more further service instances 530-2, 530-3, . . . , 530-N of a same service type are provisioned in different regions of the computing environment 410. Specifically, the target service instance 430 is provisioned in Region 1 510-1, the service instance 520-2 is provisioned in Region 2 510-2, the service instance 520-3 is provisioned in Region 3 510-3, . . . , and the service instance 520-N is provisioned in Region N 510-N, where N is an integer larger than or equal to 2. The regions 510-1, 520-2, 520-3, . . . , 520-N are distributed regions where physical resources of the computing environment 410 are deployed.

If the resource manager 420 determines that the retention policy 440 is a service aggregating policy, the resource manager 420 may perform an action of service aggregating, to aggregate the target service instance 430 and at least one of the service instances 530-2, 530-3, . . . , and 530-N of the same service type into the retention service instance 432. The at least one service instance 530-2, 530-3, . . . , or 530-N is also expected to be deprovisioned by the consumer 402. The retention service instance 432 is maintained as a unified service instance for retention of the target service instance 430 as well as other service instance(s) of the same service type.

In some embodiments, if the deprovision request for the target service instance 430 is received, the resource manager 420 may determine whether the retention service instance 432 is provisioned for the service type of the target service instance 430. If the retention service instance 432 is not provisioned in the computing environment 410, the resource manager 420 may first provision the retention service instance 432. In some examples, the retention service instance 432 may have been provisioned when the target service instance 430 is to be deprovisioned, for example, the retention service instance 432 may be provisioned when any one of the service instances 530-2, 530-3, . . . , or 530-N was deprovisioned before the target service instance 430. The configuration of deployment of the retention service instance 432 may be specified in the retention policy 440, for example, in the field of "policy property."

The resource manager 420 may aggregate the target service instance 430 into the retention service instance 432. If one or more further service instances 530-2, 530-3, . . . , and 530-N are requested to be deprovisioned, the resource manager 420 may further aggregate the service instances 530-2, 530-3, . . . , and 530-N into the retention service instance 432. By means of the aggregation, the data pertaining to the target service instance 430 and the further service instances 530-2, 530-3, . . . , and 530-N are combined in the retention service instance 432.

By aggregating more than one service instance into the unified retention service instance 432, the resource usage by the retention service instance 432 may be reduced as compared with the provisioning of the more than one service instance. After being aggregated into the retention service instance 432, the resource for provisioning the target service instance 430 as well as the service instances 530-2, 530-3, . . . , and 530-N may be released and reclaimed for the service provider 405 by the computing environment 410.

In some embodiments, the identification of the resources used for provisioning the target service instance 430 may be recorded in the restoration information 445 associated with the target service instance 430. For examples, the identification may be an identifier of a virtual namespace which is specified to identify the resources of the target service instance 430. For example, the "retention_properties" field of the restoration information 445 associated with the target service instance 430 may include the following information: aggregation: {namespace: "instanceA"}, where instanceA represents the identification of the resources of the target service instance 430.

It would be appreciated that the number of service instances, the number of regions, and the deployment of the service instances across the regions illustrated in FIG. 5 are provided for the purpose of illustration only, without suggesting any limitation to the present disclosure. For example, the plurality of service instances may not be distributed in different regions, and the retention service instance 432 may not be provisioned in the same region as the target service instance 430.

Figure 6:
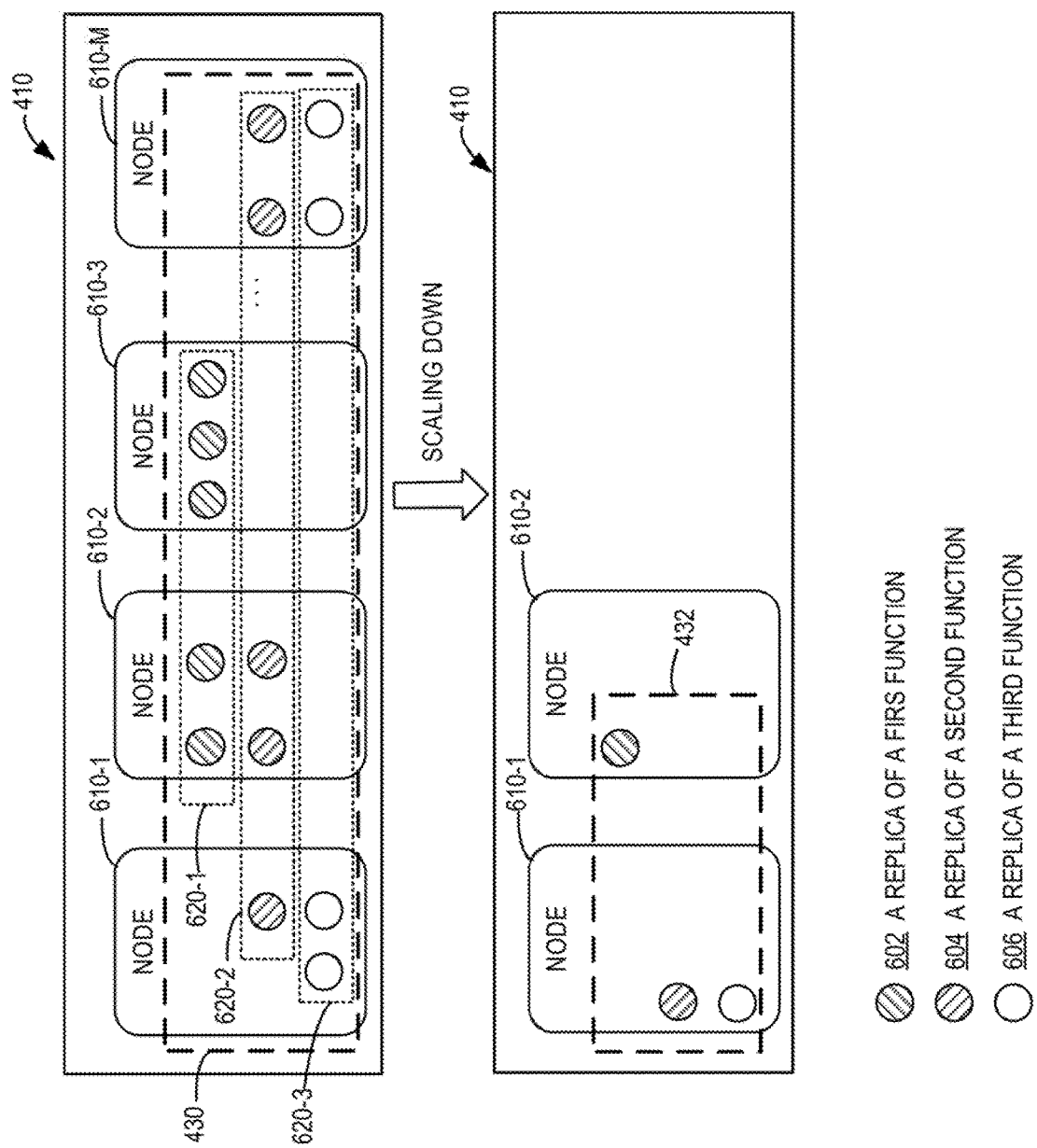
FIG. 6 depicts a block diagram of an example computing environment in which a capacity scaling policy is applied in accordance with an embodiment of the present disclosure.

FIG. 6 depicts a block diagram of an example of the computing environment 410 in which a capacity scaling policy is applied in accordance with some embodiments of the present disclosure, to reduce the capacity of the target service instance 430.

In the illustrated example, the target service instance 430 includes one or more functions and is provisioned in the computing environment 410 on a function basis. A plurality of functions, if existing, may work together to handle workload of the target service instance 430. To improve the capacity, for one or more of the functions of the target service instance 430, a plurality of replicas of the function(s) may be provisioned. In some cases, to achieve load balancing, the plurality of replicas of each function may be distributed across a plurality of computing nodes, including computing nodes 610-1, 610-2, 610-3, . . . , 610-M, where M is an integer larger than 1. For ease of discussion, the computing nodes 610-1, 610-2, 610-3, . . . , 610-M may be collectively or individually referred to as computing nodes 610. The computing nodes 610 may be physical computing nodes or virtual computing nodes virtualized based on resources of the computing environment 410.

As illustrated, a plurality of replicas 602 of a first function of the target service instance 430 are provisioned as a replica cluster 620-1, a plurality of replicas 604 of a second function of the target service instance 430 are provisioned as a replica cluster 620-2, and a plurality of replicas 606 of a third function of the target service instance 430 are provisioned as a replica cluster 620-3. The replica clusters 620-1, 620-2, and 620-3 work collectively as the target service instance 430. For ease of discussion, the replica clusters 620-1, 620-2, and 620-3 may be collectively or individually referred to as replica clusters 620. In some embodiments where the provisioning of the target service instance 430 follows a microservice design paradigm, a replica cluster 620 may be referred to as a microservice of the target service instance 430.

In some embodiments, the target service instance 430 may be provisioned or deployed according to various virtualization technologies supported by the computing environment 410, such as virtual machine (VM)-based virtualization, container-based virtualization, and/or or the like. The VM-based virtualization may include, for example, vSphere; and the container-based may include, for example, Kubernetes, Cloud Foundry, and the like.

As a specific example, a replica of a function of the target service instance 430 may be provisioned in a computing node 610 in units of container. As another example, a replica of a function of the target service instance 430 may be provisioned in units of pod (e.g., a Kubernetes pod), where each pod includes one or more containers. Either the containers or the pods corresponding to the replicas of the functions of the target service instance 430 may be initiated or stopped dynamically according to the capacity requirements.

In the cases where replicas of one or more functions of the target service instance 430 are provisioned to increase the capacity, the capacity scaling policy may be applied to the target service instance 430 for the purpose of service retention and resource usage reduction during the retention period. Specially, if the resource manager 420 determines that the retention policy 440 is a capacity scaling policy, the resource manager 420 may perform an action of scaling down a capacity of the target service instance 430.

The scaling down of the capacity may include reducing the number(s) of replicas of one or more function(s) of the target service instance 430. In some embodiments, for each function of the target service instance 430, at least one replica, which may be deployed as a container or a pod, is maintained in the computing environment 410 for the retention period and the remaining replica(s) is deleted. In an example, only one replica is maintained for each function of the target service instance 430.

Generally, each replica of a function maintains the configuration information, such as the role-based access control (RBAC) information, configuration mapping, secrete information, and the like. The few number of maintained replicas (for example, only one replica) for each function can be used to recreate a number of additional replicas of the same function for the target service instance 430 if the consumer 402 requests for restoration of this instance.

In some embodiments, if the replicas of the function of the target service instance 430 are provisioned across a cluster of computing nodes 610, the deployment of the replicas of different functions may follow an affinity policy. The affinity policy may indicate whether replicas of two or more functions are enforced to be provisioned on a same computing node 610 or not, for example, whether the replicas of two or more functions must be provisioned on the same computing node 610 or must not be provisioned on the same computing node 610 (in the latter case, the affinity policy may be considered as an anti-affinity policy). The resource manager 420 may determine which replica on the cluster nodes 610 can be maintained for each function in order to avoid violating the affinity policy.

In an example, the affinity policy may indicate the replicas 604 and 606 of the second and third functions must be provisioned on a same computing node 610 while the replicas 602 and 606 of the first and third functions must not be provisioned on a same computing node 610. Accordingly, the resource manager 420 may determine to maintain one replica 604 of the second function and one replica 606 of the third function on the computing node 610-1 and maintain one replica 602 of the first function on the different computing node 610-2. All the other replicas for the target service instance 430 may be deleted from the computing environment 410 after the action of scaling down.

In some embodiments, if no affinity policy is applied on replicas of the functions of the target service instance 430, the resource manager 420 may select the replicas to be maintained for each function in other manners, such as in a random manner.

The remaining replica(s) for the function(s) of the target service instance 430 may work as the retention service instance 432. For example, the respective replicas 602, 604, 606 of the three functions of the retention service instance 432 provisioned on the computing nodes 610-1 and 610-2 can work as the retention service instance 432. In this way, the number of the replicas is reduced. The resource usage level of the target instance 430 is reduced too as compared with the original target service 430. The resources used for provisioning the deleted replicas may be released and reclaimed. In the case that the computing nodes 610 are deployed as virtual computing nodes for the target service instance 430, the computing nodes 610 without replicas provisioned can be released, and the corresponding resources for supporting the computing nodes 610 may be reclaimed, as illustrated in FIG. 6.

In some embodiments, to ensure that the target service instance 430 can be restored to be the same from the perspective of the consumer, some runtime snapshot statics information may be recorded, for example in the associated restoration information 445 as mentioned above. For example, the restoration information 445 may be generated to further comprise information of the number of replicas (in units of containers or pods) for each function of the target service instance 430. For example, the "retention_properties" field of the restoration information 445 associated with the target service instance 430 may include the following information: scale: Replicaset {id of function}, where Replicaset {id of function} represents the number of replicas for a specific function of the target service instance 430. As such, in the restoration process, the same number of replicas can be restored in the computing environment 410 for the corresponding function of the target service instance 430.

In some examples, if the replicas of all the function(s) of the target service instance 430 are deployed across different computing nodes 610 for the purpose of load balancing, the restoration information 445 may comprise information of the number of computing nodes needed for the target service instance 430. For example, the "retention_properties" field of the restoration information 445 associated with the target service instance 430 may include the following information: scale: node number, where node number represents the number of computing nodes for the target service instance 430. As such, in the restoration process, the same number of computing nodes can be provided for provisioning the replicas of the function(s) of the target service instance 430.

It is noted that generally the consumer 402 does not care about how replicas of the function(s) of the target service instance 430 are distributed across the computing nodes 610. Thus, the restoration information 445 may not comprise information of the number of replicas of each function deployed on each computing node. If the target service instance 430 is restored, the distribution of the restored replicas may or may not be the same before the consumer 402 requested for the deprovisioning of the target service instance 430.

It would be appreciated that in the example of FIG. 6, the number of computing nodes, the number of functions, the number of the replicas for each function, and the distribution of the replicas across the computing nodes are provided for the purpose of illustration only and can be varied in different scenarios.

Figure 7:
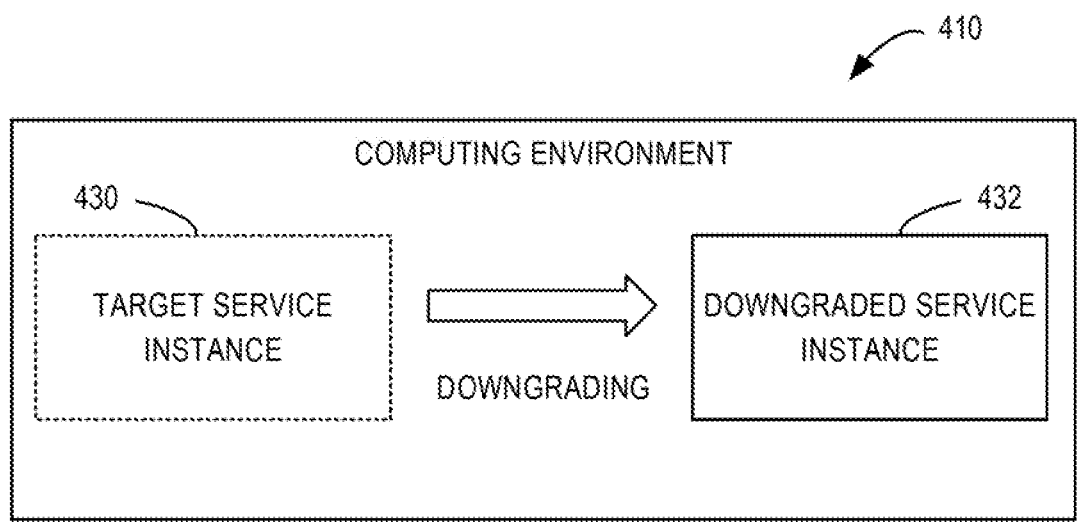
FIG. 7 depicts a block diagram of an example computing environment in which a service downgrading policy is applied in accordance with an embodiment of the present disclosure.

FIG. 7 depicts a block diagram of an example of the computing environment 410 in which a service downgrading policy is applied in accordance with some embodiments of the present disclosure.

In the illustrated example, if the retention policy 440 is the service downgrading policy, the resource manager 420 may replace the target service instance 430 with the retention service instance 432 provisioned with a lower service level agreement (SLA) than the target service instance 430. A SLA defines a performance level of a service instance. The retention service instance 432 with the lower SLA may also be referred to as a downgraded service instance 432 for the target service instance 430. Although provisioned with a lower SLA, the downgraded service instance 432 is provisioned to provide an equivalent functionality to the target service instance 430.

In some embodiments, the downgraded service instance 432 may be provisioned with a different set of resources than the set of resources used in provisioning the target service instance 430. In an example, the set of resources used in provisioning the downgraded service instance 432 may require a lower cost as compared with the set of resources used in provisioning the target service instance 430. For example, one or more types of resources, such as the processing, storage, and/or memory resources used in provisioning the target service instance 430 may be replaced with corresponding lower-cost resources (which may have smaller sizes and/or lower performance). As such, although the SLA of the retention service instance 432 is scarified, the resource usage level may be reduced.

After the downgraded service instance 432 is provisioned, the data pertaining to the target service instance 430 may be moved to be maintained in the downgraded service instance 432 and the resources used in provisioning the target service instance 430 may be released and reclaimed.

In some embodiments, the resources used to provision the downgraded service instance 432 may be specified in the retention policy 440, for example, in the field of "policy properties." In some embodiments, in addition to the identification of the resources used in provisioning the target service instance 430, a mapping between the downgraded service instance 432 and the target service instance 430 may also be recorded, for example, in the restoration information 445 associated with the target service instance 430. For example, the "retention_properties" field of the restoration information 445 may include the following information: downgrade: downgraded_service_instance_id< >, which represents an identification of the downgraded service instance 432 provisioned for the target service instance 430.

It has been discussed above how the retention service instance 432 is generated for restoration of the target service instance 430 according to different retention policies. The retention service instance 432 can be maintained in the computing environment 410 for the retention period.

In some embodiments, if the resource manager 420 receives a restoration request for restoring the target service instance 430, for example, during the retention period and from the consumer 402, the resource manager 420 may operate to restore the target service instance 430. The restoration of the target service instance 430 may be based on the retention service instance 432 and the restoration information 444. In some embodiments, if no restoration request is received, for example, after the retention period has been expired, then the set of resources used in provisioning the retention service instance 432 may be released and reclaimed for other use.

Figure 8:
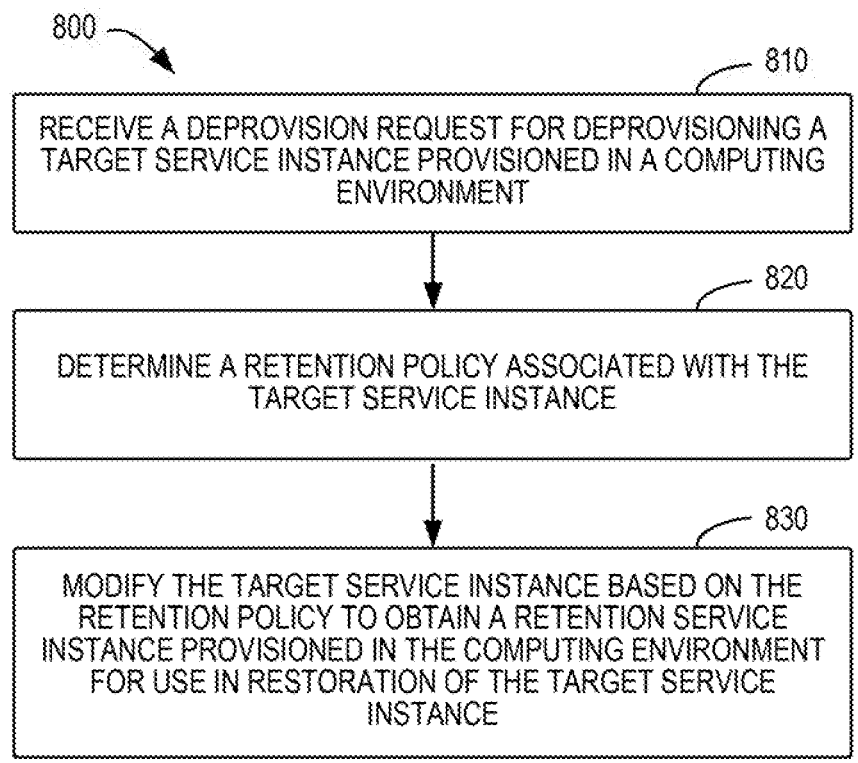
FIG. 8 depicts a flowchart of an example method in accordance with an embodiment of the present disclosure.

FIG. 8 shows a flowchart of an example method 800 in accordance with some embodiments of the present disclosure. The method 800 can be implemented at the computing environment as shown in FIG. 4. The computing environment 410 may be referred to as a resource manager 410. For the purpose of discussion, the method 800 will be described with reference to FIG. 4.

At block 810, the resource manager 410 receives a deprovision request for deprovisioning a target service instance provisioned in a computing environment. In response to the deprovision request, at block 820, the resource manager 410 determines a retention policy associated with the target service instance. The retention policy indicates an action to be applied on the target service instance. This action causes a resource usage level of the target service instance to reduce. At block 830, the resource manager 410 modifies the target service instance based on the retention policy to obtain a retention service instance provisioned in the computing environment for use in restoration of the target service instance.

In some embodiments, the method 800 further includes generating restoration information associated with the target service instance, the restoration information comprising information of the retention policy and identification of a set of resources used in provisioning the target service instance, the restoration information being maintained for a retention period; and in response to reception of a restoration request for restoring the target service instance during the retention period, restoring the target service instance in the computing environment based on the retention service instance and the restoration information.

In some embodiments, the method 800 further includes in response to the retention service instance being obtained, reclaiming a set of resources in the computing environment used in provisioning the target source instance but not used in provisioning the retention service instance.

In some embodiments, the modifying the target service instance includes: in accordance with a determination that the retention policy is a service aggregating policy, aggregating the target service instance and at least one further service instance into the retention service instance, the target service instance and the at least one further service instance being of a same service type.

In some embodiments, the modifying the target service instance includes: in accordance with a determination that a plurality of replicas of at least one function of the target service instance are provisioned in the computing environment and the retention policy is a capacity scaling policy, generating the retention service instance by maintaining at least one replica for each of the at least one function and deleting remaining replicas of the plurality of replicas. In some embodiments, the method 800 further includes generating restoration information associated with the target service instance, the restoration information comprising information of the number of replicas among the plurality among the plurality of replicas for each of the at least one function.

In some embodiments, the at least one function includes a plurality of functions. In some embodiments, the maintaining at least one replica for each of the at least one function and deleting remaining replicas of the plurality of replicas includes: in accordance with a determination that the plurality of replicas of the plurality of functions are provisioned on a cluster of computing nodes in the computing environment, selecting at least one of the plurality of replicas for each of the plurality of functions based on an affinity policy, the affinity policy indicating whether replicas of the plurality of functions are enforced to be provisioned on a same computing node; and maintaining the at least one selected replica for each of the plurality of functions while deleting remaining replicas of the plurality of replicas.

In some embodiments, the plurality of replicas is provisioned on a cluster of computing nodes in the computing environment, and wherein the restoring information further includes information of the number of computing nodes in the cluster.

In some embodiments, the modifying the target service instance includes: in accordance with a determination that the retention policy is a service downgrading policy, replacing the target service instance with the retention service instance in the computing environment, the retention service instance being provisioned with a lower service level agreement than the target service instance and providing an equivalent functionality to the target service instance.

In some embodiments, the method 800 further includes: in accordance with a determination that a retention period is expired, reclaiming a set of resources used in provisioning the retention service instance.

It should be noted that the processing of service retention or the resource manager 410 according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by one or more processors, a deprovision request for deprovisioning a target service instance provisioned in a computing environment;

in response to the deprovision request, determining, by one or more processors, a retention policy associated with the target service instance, the retention policy indicating an action to be applied on the target service instance, the action causing a resource usage level of the target service instance to reduce;

modifying, by one or more processors, the target service instance based on the retention policy to obtain a retention service instance provisioned in the computing environment for use in restoration of the target service instance, wherein modifying the target service instance comprises:
in accordance with a determination that a plurality of replicas of at least one function of the target service instance are provisioned in the computing environment and the retention policy is a capacity scaling policy, generating, by one or more processors, the retention service instance by maintaining at least one replica for each of the at least one function and deleting remaining replicas of the plurality of replicas; and generating, by one or more processors, restoration information associated with the target service instance, the restoration information comprising information of the number of replicas among the plurality of replicas for each of the at least one function.

2. The method of claim 1, further comprising:
generating, by one or more processors, restoration information associated with the target service instance, the restoration information comprising information of the retention policy and identification of a set of resources used in provisioning the target service instance, the restoration information being maintained for a retention period; and in response to reception of a restoration request for restoring the target service instance during the retention period, restoring, by one or more processors, the target service instance in the computing environment based on the retention service instance and the restoration information.

3. The method of claim 1, further comprising:
in response to the retention service instance being obtained, reclaiming, by one or more processors, a set of resources in the computing environment used in provisioning the target source instance but not used in provisioning the retention service instance.

4. The method of claim 1, wherein modifying the target service instance comprises:
in accordance with a determination that the retention policy is a service aggregating policy, aggregating, by one or more processors, the target service instance and at least one further service instance into the retention service instance, the target service instance and the at least one further service instance being of a same service type.

5. The method of claim 1, wherein the at least one function comprises a plurality of functions, and the maintaining at least one replica for each of the at least one function and deleting remaining replicas of the plurality of replicas comprises:
in accordance with a determination that the plurality of replicas of the plurality of functions are provisioned on a cluster of computing nodes in the computing environment, selecting, by one or more processors, at least one of the plurality of replicas for each of the plurality of functions based on an affinity policy, the affinity policy indicating whether replicas of the plurality of functions are enforced to be provisioned on a same computing node; and maintaining, by one or more processors, the at least one selected replica for each of the plurality of functions while deleting the remaining replicas of the plurality of replicas.

6. The method of claim 1, wherein the plurality of replicas is provisioned on a cluster of computing nodes in the computing environment, and wherein the restoring information further comprises information of a number of computing nodes in the cluster.

7. The method of claim 1, wherein the modifying the target service instance comprises:
in accordance with a determination that the retention policy is a service downgrading policy, replacing, by one or more processors, the target service instance with the retention service instance in the computing environment, the retention service instance being provisioned with a lower service level agreement than the target service instance and providing an equivalent functionality to the target service instance.

8. The method of claim 1, further comprising:
in accordance with a determination that a retention period is expired, reclaiming, by one or more processors, a set of resources used in provisioning the retention service instance.

9. A computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a deprovision request for deprovisioning a target service instance provisioned in a computing environment;

in response to the deprovision request, determining a retention policy associated with the target service instance, the retention policy indicating an action to be applied on the target service instance, the action causing a resource usage level of the target service instance to reduce;

modifying the target service instance based on the retention policy to obtain a retention service instance provisioned in the computing environment for use in restoration of the target service instance, wherein modifying the target service instance comprises:
in accordance with a determination that a plurality of replicas of at least one function of the target service instance are provisioned in the computing environment and the retention policy is a capacity scaling policy, generating the retention service instance by maintaining at least one replica for each of the at least one function and deleting remaining replicas of the plurality of replicas; and generating restoration information associated with the target service instance, the restoration information comprising information of a number of replicas among the plurality of replicas for each of the at least one function.

10. The computer system of claim 9, further comprising:
generating restoration information associated with the target service instance, the restoration information comprising information of the retention policy and identification of a set of resources used in provisioning the target service instance, the restoration information being maintained for a retention period; and in response to reception of a restoration request for restoring the target service instance during the retention period, restoring the target service instance in the computing environment based on the retention service instance and the restoration information.

11. The computer system of claim 9, further comprising:
in response to the retention service instance being obtained, reclaiming a set of resources in the computing environment used in provisioning the target source instance but not used in provisioning the retention service instance.

12. The computer system of claim 9, wherein the modifying the target service instance comprises:
in accordance with a determination that the retention policy is a service aggregating policy, aggregating the target service instance and at least one further service instance into the retention service instance, the target service instance and the at least one further service instance being of a same service type.

13. The computer system of claim 9, wherein the at least one function comprises a plurality of functions, and maintaining at least one replica for each of the at least one function and deleting remaining replicas of the plurality of replicas comprises:
in accordance with a determination that the plurality of replicas of the plurality of functions are provisioned on a cluster of computing nodes in the computing environment, selecting at least one of the plurality of replicas for each of the plurality of functions based on an affinity policy, the affinity policy indicating whether replicas of the plurality of functions are enforced to be provisioned on a same computing node; and
maintaining the at least one selected replica for each of the plurality of functions while deleting the remaining replicas of the plurality of replicas.

14. The computer system of claim 9, wherein the plurality of replicas is provisioned on a cluster of computing nodes in the computing environment, and wherein the restoring information further comprises information of a number of computing nodes in the cluster.

15. The computer system of claim 9, wherein the modifying the target service instance comprises:
in accordance with a determination that the retention policy is a service downgrading policy, replacing the target service instance with the retention service instance in the computing environment, the retention service instance being provisioned with a lower service level agreement than the target service instance and providing an equivalent functionality to the target service instance.

16. The computer system of claim 9, further comprising:
in accordance with a determination that a retention period is expired, reclaiming a set of resources used in provisioning the retention service instance.

17. A computer program product, the computer program product comprising:
one or more computer readable storage medium and program instructions stored on at least one of the one or more tangible storage medium, the program instructions executable by a processor, the program instructions comprising:

program instructions to receive a deprovision request for deprovisioning a target service instance provisioned in a computing environment;
in response to the deprovision request, program instructions to determine a retention policy associated with the target service instance, the retention policy indicating an action to be applied on the target service instance, the action causing a resource usage level of the target service instance to reduce;
program instructions to modify the target service instance based on the retention policy to obtain a retention service instance provisioned in the computing environment for use in restoration of the target service instance,
wherein modifying the target service instance comprises:
in accordance with a determination that a plurality of replicas of at least one function of the target service instance are provisioned in the computing environment and the retention policy is a capacity scaling policy, generating the retention service instance by maintaining at least one replica for each of the at least one function and
deleting remaining replicas of the plurality of replicas; and generating restoration information associated with the target service instance, the restoration information comprising information of a number of replicas among the plurality of replicas for each of the at least one function.

18. The computer program product of claim 17, further comprising:
program instructions to generate restoration information associated with the target service instance, the restoration information comprising information of the retention policy and identification of a set of resources used in provisioning the target service instance, the restoration information being maintained for a retention period; and
in response to reception of a restoration request for restoring the target service instance during the retention period, restoring the target service instance in the computing environment based on the retention service instance and the restoration information.

19. The computer program product of claim 17, wherein the at least one function comprises a plurality of functions, and maintaining at least one replica for each of the at least one function and deleting remaining replicas of the plurality of replicas comprises:
in accordance with a determination that the plurality of replicas of the plurality of functions are provisioned on a cluster of computing nodes in the computing environment, selecting at least one of the plurality of replicas for each of the plurality of functions based on an affinity policy, the affinity policy indicating whether replicas of the plurality of functions are enforced to be provisioned on a same computing node; and
maintaining the at least one selected replica for each of the plurality of functions while deleting the remaining replicas of the plurality of replicas.

20. The computer program product of claim 17, wherein the plurality of replicas is provisioned on a cluster of computing nodes in the computing environment, and wherein the restoring information further comprises information of a number of computing nodes in the cluster.

* * * * *